United States Patent
Kane, Jr.

(10) Patent No.: US 7,991,757 B2
(45) Date of Patent: Aug. 2, 2011

(54) SYSTEM FOR OBTAINING RECOMMENDATIONS FROM MULTIPLE RECOMMENDERS

(75) Inventor: Francis J. Kane, Jr., Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 406 days.

(21) Appl. No.: 12/190,471

(22) Filed: Aug. 12, 2008

(65) Prior Publication Data

US 2010/0042608 A1 Feb. 18, 2010

(51) Int. Cl.
*G06F 17/30* (2006.01)
(52) U.S. Cl. .................................. 707/706; 707/748
(58) Field of Classification Search .................. 707/706, 707/748
See application file for complete search history.

(56) References Cited

U.S. PATENT DOCUMENTS

| | | | |
|---|---|---|---|
| 5,749,081 A | 5/1998 | Whiteis | |
| 5,815,665 A | 9/1998 | Teper et al. | |
| 6,014,664 A | 1/2000 | Fagin et al. | |
| 6,029,141 A | 2/2000 | Bezos et al. | |
| 6,134,532 A | 10/2000 | Lazarus et al. | |
| 6,182,050 B1 | 1/2001 | Ballard | |
| 6,282,548 B1 | 8/2001 | Burner et al. | |
| 6,317,722 B1 | 11/2001 | Jacobi et al. | |
| 6,438,579 B1 | 8/2002 | Hosken | |
| 6,442,542 B1 * | 8/2002 | Ramani et al. ............. 714/25 |
| 6,460,036 B1 * | 10/2002 | Herz ....................... 707/748 |
| 6,493,702 B1 * | 12/2002 | Adar et al. ................. 707/706 |
| 6,535,888 B1 * | 3/2003 | Vijayan et al. ............. 707/706 |
| 6,598,026 B1 | 7/2003 | Ojha et al. | |
| 6,601,075 B1 * | 7/2003 | Huang et al. ............... 707/748 |
| 6,611,814 B1 | 8/2003 | Lee et al. | |
| 6,618,727 B1 * | 9/2003 | Wheeler et al. ............ 707/748 |
| 6,691,163 B1 | 2/2004 | Tufts | |
| 6,704,727 B1 | 3/2004 | Kravets | |
| 6,853,982 B2 | 2/2005 | Smith et al. | |
| 6,865,573 B1 * | 3/2005 | Hornick et al. ............ 707/748 |
| 6,873,985 B2 * | 3/2005 | Newman .................... 707/743 |
| 6,889,250 B2 | 5/2005 | Bezos et al. | |
| 6,912,505 B2 | 6/2005 | Linden et al. | |
| 6,981,040 B1 | 12/2005 | Konig et al. | |
| 7,003,515 B1 | 2/2006 | Glaser et al. | |
| 7,007,006 B2 * | 2/2006 | Zilio et al. ................. 707/717 |
| 7,092,941 B1 * | 8/2006 | Campos ..................... 707/737 |

(Continued)

FOREIGN PATENT DOCUMENTS

WO WO 01/15002 A2 3/2001

(Continued)

OTHER PUBLICATIONS

U.S. Appl. No. 11/758,932, filed Jun. 6, 2007 (application, text, drawings, and filing receipt provided).

(Continued)

*Primary Examiner* — Don Wong
*Assistant Examiner* — Kim T Nguyen
(74) *Attorney, Agent, or Firm* — Knobbe Martens Olson & Bear LLP

(57) ABSTRACT

A personalization network service enables developers to develop recommenders that can be made available to content site operators for providing recommendations to end users. The personalization network service may also be capable of optimizing the use and selection of the recommenders for different end users, groups or segments of end users, content sites, and the like.

28 Claims, 6 Drawing Sheets

U.S. PATENT DOCUMENTS

| | | |
|---|---|---|
| 7,114,170 B2 | 9/2006 | Harris et al. |
| 7,152,061 B2 | 12/2006 | Curtis et al. |
| 7,310,612 B2 | 12/2007 | McQueen, III et al. |
| 7,548,914 B2 | 6/2009 | Bell et al. |
| 7,590,562 B2 | 9/2009 | Stoppelman |
| 7,594,189 B1 | 9/2009 | Walker et al. |
| 7,765,130 B2 | 7/2010 | McQueen, III et al. |
| 2001/0014868 A1 | 8/2001 | Herz et al. |
| 2002/0010625 A1 | 1/2002 | Smith et al. |
| 2002/0087515 A1 | 7/2002 | Swannack et al. |
| 2002/0116310 A1 | 8/2002 | Cohen et al. |
| 2002/0128959 A1 | 9/2002 | Kostic et al. |
| 2002/0138354 A1 | 9/2002 | Seal et al. |
| 2002/0184139 A1 | 12/2002 | Chickering et al. |
| 2002/0198882 A1 | 12/2002 | Linden et al. |
| 2003/0105682 A1 | 6/2003 | Dicker et al. |
| 2003/0126235 A1 | 7/2003 | Chandrasekar et al. |
| 2003/0126606 A1 | 7/2003 | Buczak et al. |
| 2003/0172357 A1 | 9/2003 | Kao et al. |
| 2003/0233422 A1 | 12/2003 | Csaszar et al. |
| 2004/0034652 A1 | 2/2004 | Hofmann et al. |
| 2004/0093321 A1 | 5/2004 | Roustant et al. |
| 2004/0103186 A1 | 5/2004 | Casati et al. |
| 2005/0004880 A1 | 1/2005 | Musgrove et al. |
| 2005/0033657 A1 | 2/2005 | Herrington et al. |
| 2005/0038717 A1 | 2/2005 | McQueen, III et al. |
| 2005/0038819 A1 | 2/2005 | Hicken et al. |
| 2005/0071251 A1 | 3/2005 | Linden et al. |
| 2005/0091245 A1 | 4/2005 | Chickering et al. |
| 2005/0171861 A1 | 8/2005 | Bezos et al. |
| 2005/0216516 A1 | 9/2005 | Calistri-Yeh et al. |
| 2005/0234952 A1 | 10/2005 | Zeng et al. |
| 2005/0256866 A1 | 11/2005 | Lu et al. |
| 2005/0256867 A1 | 11/2005 | Walther et al. |
| 2006/0106665 A1 | 5/2006 | Kumar et al. |
| 2006/0184566 A1 | 8/2006 | Lo et al. |
| 2006/0206478 A1 | 9/2006 | Glaser et al. |
| 2006/0212442 A1 | 9/2006 | Conrad et al. |
| 2006/0212444 A1 | 9/2006 | Handman et al. |
| 2006/0242139 A1 | 10/2006 | Butterfield et al. |
| 2007/0005437 A1 | 1/2007 | Stoppelman |
| 2007/0011203 A1 | 1/2007 | Tsunoda |
| 2007/0016575 A1 | 1/2007 | Hurst-Hiller et al. |
| 2007/0032244 A1 | 2/2007 | Counts et al. |
| 2007/0043688 A1 | 2/2007 | Kountz et al. |
| 2007/0067217 A1 | 3/2007 | Schachter et al. |
| 2007/0078832 A1 | 4/2007 | Ott, IV et al. |
| 2008/0005064 A1 | 1/2008 | Sarukkai |
| 2008/0040301 A1 | 2/2008 | Sadagopan et al. |
| 2008/0040313 A1 | 2/2008 | Schachter |
| 2008/0243631 A1 | 10/2008 | Kane et al. |
| 2008/0243632 A1 | 10/2008 | Kane et al. |
| 2008/0255934 A1 | 10/2008 | Leventhal et al. |
| 2009/0006373 A1 | 1/2009 | Chakrabarti et al. |
| 2009/0006374 A1 | 1/2009 | Kim et al. |
| 2009/0006398 A1* | 1/2009 | Lam et al. .................. 707/7 |
| 2009/0138326 A1 | 5/2009 | Shi |
| 2010/0191619 A1* | 7/2010 | Dicker et al. ............... 705/27 |
| 2010/0306194 A1* | 12/2010 | Evans ...................... 707/733 |

FOREIGN PATENT DOCUMENTS

| | | |
|---|---|---|
| WO | WO 01/25947 | 4/2001 |
| WO | WO 02/19203 | 3/2002 |
| WO | WO 2008/121737 | 10/2008 |

OTHER PUBLICATIONS

U.S. Appl. No. 11/227,891, filed Mar. 29, 2006 (application, text, drawings, and filing receipt provided).

Riggs, T. and Wilensky, R., *"An Algorithm for Automated Rating of Reviewers,"* International Conference on Digital Libraries, Proceedings of the First ACM/IEEE-CS Joint Conference on Digital Libraries, pp. 381-387 (2001).

Four web pages printed from www.newsmonster.org site on Aug. 8, 2003; namely web pages at www.newsmonster.org/profile.html (3 printed pages), www.newsmonster.org/reputation.html (1printed page); www.newsmonster.org/intro-Sortby Reputation.html (1printed page), and www.newsmonster.org/feature-breakdown.html (2 printed pages).

Searls, D., and Sifry, D., *"Building with Blogs,"* Linux Journal, vol. 2003, Issue 107, p. 4, dated Mar. 2003.

Roscheisen, M., Mogensen, C. and Winograd, T., *"Beyond Browsing: Shared Comments, SOAPS, Trails and On-Line Communities,"* Proceedings of the Third International World-Wide Web Conference, Computer Networks and ISDN Systems 27, pp. 739-749, dated Apr. 10-14, 1995.

Resnick, P., Iacovou, N., Suchak, M., Bergstrom, P., and Riedl, J., *"GroupLens: An Open Architecture for Collaborative Filtering of Netnews,"* Proceedings of ACM 1994 Conference on Computer Supported Cooperative Work, pp. 175-186 (1994).

Mills, Elinor, CNET News article titled "Google book scanning still on hold,"dated Nov. 4, 2005, printed from www.news.com.

International Search Report and Written Opinion in counterpart PCT application PCT/US 08/58516.

U.S. Appl. No. 10/864,288, filed Jun. 9, 2004 (application text, drawings, and filing receipt provided).

Press release titled "Aggregate Knowledge Delivers Relevance and Increases Revenue for Retail and Media Sites," dated Mar. 7, 2006.

Press release titled "Aggregate Knowledge Unveils the Internet's First Discovery Service," dated Jan. 30, 2007.

Ibrahim Cingil, et al. "A Broader Approach to Personalization,"Communications of the ACM, vol. 43, No. 8, dated Aug. 2000, pp. 136-141.

Erick Schonfeld, "The Great Giveaway," article in Business 2.0 Magazine dated Apr. 1, 2005.

Blog posting titled "Loomia: A product-recommendation Web service," Alpha Blog, Alpha.cnet.com, dated Jul. 10, 2006 posted by Andrew Gruen, printed form http://reviews.cnet.com/4531-10921_7-6550327.html.

Ellenberg, Jordan, "The Netflix Challenge." Wired, Mar. 16, 2008, p. 114-122.

Abhinandan Das; Mayur Datar; Ashutosh Garg; Shyam Rajaram; Google News Personalization: Scalable Online Collaborative Filtering, WWW 2007/Track: Industrial Practice and Experience, May 8-12, 2007, (271-280), Banff, Alberta, Canada.

Filing Receipt, Specification and Drawings of related pending U.S. Appl. No. 11/281,886, filed Nov. 17, 2005. Title: Recommendations based on item tagging activities of users. Inventors: Aaron Donsbach, et al.

"Just Add People—Collaborative filtering brings human input to information retrieval in the enterprise," Journal ISSN: 8750-6874, Information Week, p. 65, Dec. 22, 1997.

Adam Mathes, "Folksonomies—Cooperative Classification and Communication Through Shared Metadata" [online], Dec. 2004, Retrieved from Internet: URL: http://www.adammathes.com/academic/computer-mediated-communication/folksonomies.html > 18 pages.

J. Rucker, et al., "Siteseer: Personalized Navigation for the Web," Communications of the ACM, Mar. 1997, vol. 40, No. 3, pp. 73-75.

J. Udell, "Collaborative Knowledge Gardening," InfoWorld.com article, dated Aug. 20, 2004, pp. 1-4.

Luigi Canali De Rossi, "Grassroots Cooperative Categorization of Digital Contents Assets: Folksonomies, What They Are, Why They Work" [online], Jan. 5, 2005. Retrieved From Internet: <URL: http://www.masternewmedia.org/2005/01/05/grassroots_cooperative_categorization_of_digital.htm> 12 pages.

M. Eirinaki, et al., "SEWeP: Using Site Semantics and a Taxonomy to Enhance the Web Personalization Process," SIGKDD'03, ACM 1-58113-737-0/03/0008, Aug. 24-27, 2003, pp. 99-108.

M. Roscheisen et al., "Beyond browsing: shared comments, SOAPs, trails, and on-line communities," Computer Networks and ISDN Systems 27 (1995), pp. 739-749.

Roland Piquepaille, How do you use del.icio.us?, Published on Nov. 8, 2004, Archive.org on Nov. 10, 2004, Roland Piquepaille's Technology Trends, pp. 1-4.

T. Hammond, et al., "Social Bookmarking Tools (I),"D-Lib Magazine, ISSN 1082-9873, Apr. 2005, vol. II, No. 4, pp. 1-23.

\* cited by examiner

SYSTEM FOR OBTAINING RECOMMENDATIONS FROM MULTIPLE RECOMMENDERS

BACKGROUND

Relatively large and sophisticated web sites commonly implement some form of personalization system to provide personalized content, such as personalized item recommendations, to their users. To illustrate, some personalization systems can monitor and record one or more types of item-related user activity such as item purchases, item viewing events, and/or item rentals, and analyze the collected data to detect and quantify associations between particular items. When a user accesses a particular item, such as a particular product in a catalog of an e-commerce site, or an article on a news site, an appropriate message may be displayed notifying the user of related items (e.g., "people who bought this item also bought . . . ," or "people who viewed this item also viewed . . . "). The personalization system may also generate personalized item recommendations that are based on a target user's purchase history, item viewing history, item ratings, and/or some other type of user data.

BRIEF DESCRIPTION OF THE DRAWINGS

Throughout the drawings, reference numbers may be reused to indicate correspondence between referenced elements. The drawings are provided to illustrate embodiments of the inventions described herein and not to limit the scope thereof.

DETAILED DESCRIPTION

Figure 1:
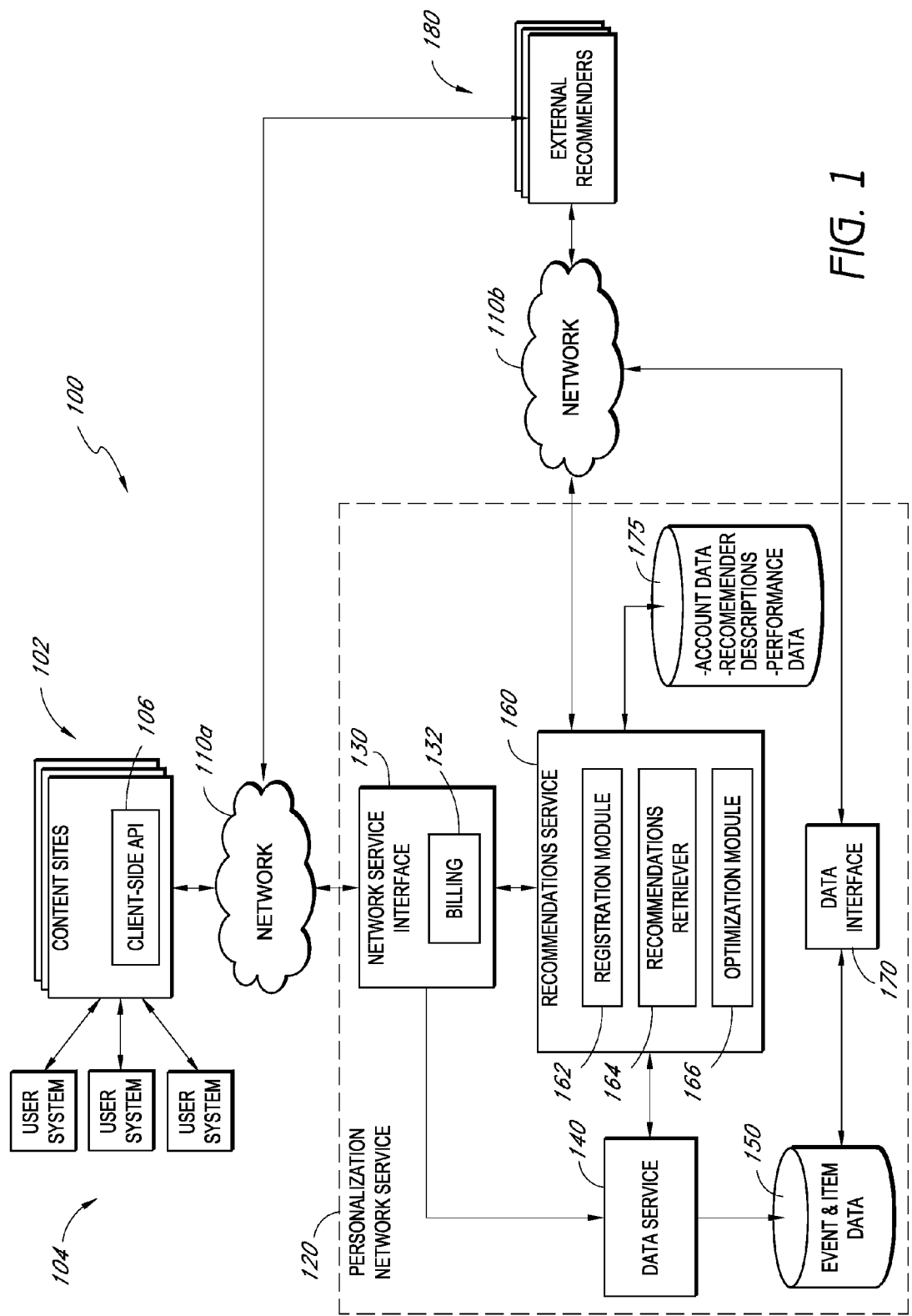
FIG. 1 illustrates an embodiment of a network environment suitable for providing recommendations to content sites.

Existing personalization systems suffer from several drawbacks. For instance, personalization systems tend to be expensive to implement and maintain. Some relatively sophisticated personalization systems use infrastructure components which, among other tasks, store customer behavior data, process the stored behavior data to detect the item associations, and store databases which relate items to one another. As a result, among other reasons, sophisticated personalization systems are typically available only to relatively large companies. In addition, no single recommendation algorithm may be suitable for all recommendation contexts, and it can be desirable to be able to use different recommendation algorithms for different contexts. Recommendation contexts can encompass the type of content site being browsed, the type(s) of items being recommended, the type or quantity of information available for a given user, and the like.

In certain embodiments, a computer system and service are provided that allow operators of interactive computer systems (e.g., content sites) to offload the tasks of generating and hosting recommendation software to a community of developers. In some embodiments, the service is implemented as a network service, such as a web service, that is accessible over a public network such as the Internet. The network service may obtain the recommendations from external recommenders provided by different business entities from the operator/ provider of the network service. Advantageously, in certain embodiments the network service enables content sites to use different recommendation algorithms for different contexts. Additionally, the network service can determine, in an automated manner, which recommenders work best in particular recommendation contexts.

For purposes of illustration, the network service will be described in the context of content sites (e.g., web sites) that use the network service to generate or select content to present to users of the content sites. As will be recognized, however, content sites are merely one type of interactive computer system that can use the network service. Other examples include interactive television systems, online services networks, in-store kiosks, and systems that provide recommendations to users by email. The content sites typically host electronic catalogs or repositories of items that are available for purchase, rent, download, subscription, viewing, and/or some other form of consumption. Examples include retailer web sites, music and video download sites, online travel reservation sites, news sites, auction sites, shopping portals, dating sites, social networking sites and sites that provide a combination of these functions. The content sites may use the network service to perform a variety of services, including but not limited to the following: (a) storing and maintaining user-specific event histories, such as item purchase histories, item viewing histories, item rental histories, and/or search histories and (b) obtaining personalized item recommendations for users.

As used herein, the term "item" in addition to having its ordinary meaning, is used interchangeably to refer to an item itself (e.g., a particular product) and to its description or representation in an electronic catalog or data repository. As will be apparent from the context in which it is used, the term is also sometimes used herein to refer only to the item itself or only to its representation in an electronic catalog or data repository. Items that may be recommended to users may include, among others, products, web sites, advertisements, news articles, blogs, travel destinations, service providers, other users, and events. Additionally, as used herein, the terms "view," "viewing event," and the like, in addition to having their ordinary meaning, can include impressions (e.g., of recommendations), user selections, mouse clicks, and the like.

FIG. 1 illustrates an embodiment of a network environment 100 suitable for providing item recommendations. The network environment 100 includes a personalization network service (PNS) 120 that can be implemented with a server system that may include one or more physical servers or computing machines (not shown). In addition, the PNS 120 can be implemented as a network resource, such as a web service, web site, or the like. Advantageously, in certain embodiments, the PNS 120 can provide recommendations from external recommenders 180 to end users of one or more content sites 102.

Two primary types of entities access and establish accounts with the PNS 120: content site 102 operators and developers. The content site 102 operators operate web sites, and/or other types of interactive sites or systems, that use the PNS 120 to obtain recommendations to present to end users operating user systems 104. The developers are individuals or organizations that develop the recommenders used to generate such recommendations. (The developers are also referred to herein as "recommender providers.") Account data for registered content site operators and recommender providers may be stored in a data repository 175. Different recommenders 180 may be provided by different developers, although a single developer may provide multiple recommenders 180. As described below, the content site 102 operators may be charged a usage-based or other fee for using the PNS 120 to provide recommendations to their users. A portion of the resulting revenue may be paid to the developers, with the amount paid to a given developer optionally being based on the performance of its recommender(s) 180.

The content sites 102 can communicate with the PNS 120 over a network 110a. Each of the content sites 102 can include network resources such as web sites that respond to network requests received from browsers or other software on user systems 104 of end users. The user systems 104 may be computing devices such as desktop computers, web pads, personal digital assistants (PDAs), mobile phones, set-top television boxes, media players, laptop computers, tablets, desktop computers, electronic book readers, kiosks, and the like. The network 110a may be a network such as the Internet, a local or wide area network (LAN or WAN), or the like.

The content sites 102 may be operated or provided by different business entities from one another, and by entities other than the operator/provider of the PNS 120. In general, the user systems 104 access electronic catalogs or repositories of items hosted by the content sites 102. As user systems 104 perform specific types of item-related events (e.g., item purchases, item downloads, item rentals, item viewing events, item rating events, etc.), the content sites 102 can report these events to the PNS 120. For example, the content sites 102 may report the events using application programming interface (API) calls to an API provided by a network service interface 130 of the PNS 120. Thus, in certain embodiments, the content sites 102 can act as web service clients when communicating with the PNS 120.

A client-side API module 106 of each content site 102 can implement the API calls to the network service interface 130. In certain embodiments, the client-side API module 106 can include one or more software components that implement the API described in U.S. patent application Ser. No. 11/691,758, entitled "Service for Providing Item Recommendations," filed Mar. 30, 2007 (the "'758 application"), the disclosure of which is hereby incorporated by reference in its entirety. In particular, paragraphs [0065] through [0095] of the '758 application, which disclose an example API, are specifically incorporated by reference herein. In other embodiments, the content sites 102 can use a non-API based mechanism for reporting events, such as a representational state transfer (REST) architecture. In addition, in other implementations, some or all of the content sites 102 may report the events directly to the external recommenders 180, either in addition or as an alternative to reporting such events to the PNS 120.

The PNS 120 may additionally or alternatively collect event data using other methods. For example, operators of the content sites 102 may be provided with widget code to add to their web pages. When a browser running on a user system 104 loads such a web page, the widget code may cause the browser to report the page-load event directly to the PNS 120, as described in U.S. application Ser. No. 11/966,780, filed Dec. 28, 2007, the disclosure of which is hereby incorporated by reference. The event data reported/recorded in such scenarios may, for example, include any one or more of the following: the URL accessed, an identifier of an item represented on the accessed page, a cookie that identifies the user, and the type of event performed.

As another example, the operator of the PNS 120 may also operate an e-commerce site that hosts an electronic catalog of items. As described the '780 application referenced above, events recorded by this e-commerce site (e.g., item purchases, item viewing events, etc.) then be used to supplement the event data reported by the content sites 102. As yet another example, end users may be provided with a browser toolbar or plug-in that causes the user systems 104 to report various types of events directly to the PNS 120.

The network service interface 130 can include one or more software modules for communicating events received from the content sites 102 to a data service 140. The data service 140 can include one or more software components for persistently storing data descriptive of the events in a data repository 150. The data service 140 may store the event data in association with an identifier of an end user and in association with an identifier of the content site 102 that reported the event. Each operator of a content site 102 can decide which events and event types to report to the PNS 120. The content sites 102 can also provide bulk transfers of event data using an API of the network service interface 130.

The network service interface 130 may also include a billing component 132 which can, in some embodiments, perform authentication, metering, and/or billing. According to some embodiments, for example, content sites 102 can be billed for requests and/or for the storage of user data. In addition, as will be described in greater detail below, the billing component 132 can cause operators or providers of external recommenders 180 to be compensated for purchases made, or other transaction conducted, in response to recommendations (see FIG. 5).

The network service interface 130 can also respond to data requests from the content sites 102. The data requests may include, for example, requests for lists of items that are related to a particular source item and requests for personalized recommendations for a particular user. (Both of these types of item content are referred to herein generally as recommendations.) According to some embodiments, the data requests are generated by the content sites 102 in response to page requests (e.g., HTTP requests) from user systems 104. The PNS's 120 responses to these requests may be embodied in specific or general purpose languages, such as, among other languages, extensible markup language (XML). The requesting web site 102 typically parses the response, and uses the response to retrieve or generate HTML or other content for displaying the recommendations within the requested web page. For example, the requesting web site may translate an XML-based list of recommended items into an HTML sequence that displays descriptions of these items to the user systems 104.

The network service interface 130 communicates the received data requests to a recommendations service 160. In certain embodiments, the recommendations service 160 communicates with one or more external recommenders 180 over a network 110b. The external recommenders 180 can be operated by separate business entities from each other and from the PNS 120. The external recommenders 180 can be hosted on servers that are separate from the PNS 120. For example, each provider/developer of an external recommender 180 may be responsible for determining how and where the respective recommender is to be hosted. Alternatively, some or all of the recommenders 180 can be hosted on one or more servers of the PNS 120. Although they may be hosted on one or more servers of the PNS 120, the recommenders 180 are still referred to herein as "external" to distinguish from recommenders that may be developed by an operator of the PNS 120. The various external recommenders 180 can include different algorithms for generating recommendations. Competition between providers/developers of the external recommenders 180 can result in better recommendations being provided to the content sites 102.

The depicted embodiment of the recommendations service 160 includes a registration module 162 that includes one or more software components for registering the external recommenders 180 with the recommendations service 160. For example, the registration module 162 can allow a provider of an external recommender 180 to provide machine-readable descriptions of the external recommenders 180. These descriptions may include network addresses, such as uniform resource indicators (URI), that identify the external recommenders 180 to the recommendations service 160. The registration module 162 can store the machine-readable and human-readable descriptions of the recommenders in the data repository 175. The registration module 162 may also collect information about the external recommenders 180 and make this information available to the content sites 102 using a web site or extranet of the PNS 120 provider. The operators of the content sites 102 can optionally select which external recommenders 180 to use to receive recommendations (see FIG. 6).

The recommendation service 160 also includes a recommendations retriever 164, which can include one or more software components for querying, invoking, or otherwise causing the external recommenders 180 to provide recommendations. For instance, in one embodiment the recommendations retriever 164 queries the external recommenders 180 for recommendations in response to a request from a content site 102. Requests for recommendations from the recommendations retriever 164 may be web services calls, such as REST-based or SOAP-based calls. The requests for recommendations may include a user identifier corresponding to an end user to whom recommendations may be provided, a content site identifier to identify a content site 102, a segment identifier to identify a segment or group of users (e.g., segmented by gender, age, interest, occupation, or the like), and/or one or more item identifiers. In alternative embodiments, the recommendations requests may come directly from the computing devices of the end users. For example, widget code embedded in a web page served by a content site 102 to a user system 104 system can request recommendations from the network service interface 130 over the network 110a.

One or more of these identifiers may be created by either the content site 102 or the recommendation service 160. For example, the recommendation service 160 may issue a cookie containing a user identifier to an end user's browser in response to determining that no user identifier has been created. Alternatively, the content site 102 can create the cookie or use another mechanism for creating user identifiers. In addition, the content sites 102 or recommendation service 160 can associate segment identifiers with various user identifiers. The segment identifiers may be associated with users of a single content site 102 or with users across multiple content sites 102 (e.g., all 50+ year-old males across all content sites 102).

In response to the recommendation requests, the external recommenders 180 may communicate with a data interface 170 in real-time to retrieve event data from the data repository 150. The real-time transfer of event data can be signed and authenticated to protect user privacy. In addition, the external recommenders 180 can communicate with the data interface 170 to obtain the item data from the data repository 150. This item data may include catalog data provided by the content sites 102 to the PNS 120. In alternative embodiments, the external recommenders 180 may obtain at least some of the event and/or item data by performing bulk transfers from the data interface 170. In one embodiment, the bulk transfer of event data can be performed over a secure FTP connection to preserve the privacy of customer data. The bulk transfers may be performed in an off-line process, for example, once daily. In alternative embodiments, the external recommenders 180 may communicate with the content sites 102 directly through the network 110 to receive event and/or item data.

The external recommenders 180 can analyze the event and/or item data to generate recommendations for the content sites 102. Different external recommenders 180 may analyze different types of events, items, item attributes, and/or user profile data in order to generate recommendations. Different external recommenders 180 may also specialize in providing recommendations for different browsing contexts, web site categories, user segments, event types and/or types of items. The external recommenders 180 can return recommendations that include item identifiers and corresponding scores to indicate the relative strengths of the recommendations. The content sites 102 can cause the recommendations to be displayed on user systems 104, such as by dynamically incorporating the recommendations into web pages requested by the user systems 104. To increase brand exposure for recommender providers, the content sites 102 may also cause recommender providers logos to be displayed in proximity to the recommendations.

An optimization module 166 of the recommendation service 160 can optimize the results returned by the external recommenders 180 based on various criteria, which will be described below with respect to FIG. 3. In one embodiment, the optimization module 166 applies weights to the recommendations from each external recommender 180. The weights can be used to selectively emphasize or deemphasize recommendations from various external recommenders 180. In some implementations, the content sites 102 may be able to select which weights are applied by the optimization module 166. The optimization module 166 may store the weights in the data repository 175. Additionally, the optimization module 166 can store data on the external recommenders 180 performance in the data repository 175.

In addition to the recommendations provided by the external recommenders 180, the PNS 120 may be capable of using the event data to generate lists of the most popular items. Separate lists may be generated for different types of items, and for different types of events (e.g., views versus purchases). These lists may be made available to the content sites 102 as recommendations via an API. In addition, in some implementations the recommendations service 160 may also generate personalized recommendations in addition to those generated by the external recommenders 180. Additionally or alternatively, the recommendations service 160 may generate item-to-item similarity mappings based on the event and item data and make these similarity mappings available to the external recommenders 180. The external recommenders 180 can use the similarities as a basis for their own recommendations algorithms. Examples of processes that may be used to generate item-to-item similarity mappings, and to use such mappings to generate personalized recommendations, are described in U.S. Pat. No. 6,853,982, entitled "Content Personalization Based on Actions Performed During a Current Browsing Session."

Advantageously, in certain embodiments the PNS 120 may be tailored for use with any suitable content site 102 (or other type of system) and is not limited to any specific type of content site 102. Examples include, but are not limited to, electronic shopping sites, news sites, content aggregator sites, music download sites, redirectors, social networks, interactive television systems, email-based mass marketing systems, and search engines. The PNS 120 enables the content sites 102 to provide item recommendations and other forms of behavior-based content to their users. For example, an end user viewing a pair of shoes on a merchants content site 102 might receive a recommendation for shoe laces or shoes with similar designs. Similarly, end users viewing a news site for information on a local festival might receive a recommendation for articles written about other local festivals. Likewise, end users viewing a retailer site might receive personalized product recommendations based on a history of the user's transactions or other types of events associated with the user (e.g., a list of the last N items viewed or the last N items purchased). These recommendations in turn may encourage end users to spend more time using the content sites 102 and conducting associated transactions.

Advantageously, in certain embodiments the PNS 120 allows content site 102 operators to offload the tasks of generating and hosting recommendation software to a community of developers. Moreover, by optimizing the recommendations from the external recommenders 180, in certain embodiments the PNS 120 can improve the quality of the recommendations provided to the content sites 102.

In addition to the embodiments shown, some or all of the recommenders 180 may be developed internally by the operator of the PNS 120 and hosted on the PNS's 120 servers. Advantageously, in certain embodiments, the optimization techniques described herein may be used to assign weights to these internal recommenders based on their performance. The internal recommenders may also be compared and weighted against the external recommenders 180. In addition, the internal recommenders may also be implemented with certain of the techniques described in U.S. patent application Ser. No. 11/771,914, entitled "Recommendation System with Multiple Integrated Recommenders," filed Jun. 29, 2007 (the "'914 application"), the disclosure of which is hereby incorporated by reference in its entirety. In particular, paragraphs [0019] through [0047] of the '914 application, which discuss various embodiments of multiple recommender systems, are specifically incorporated by reference herein.

Figure 2:
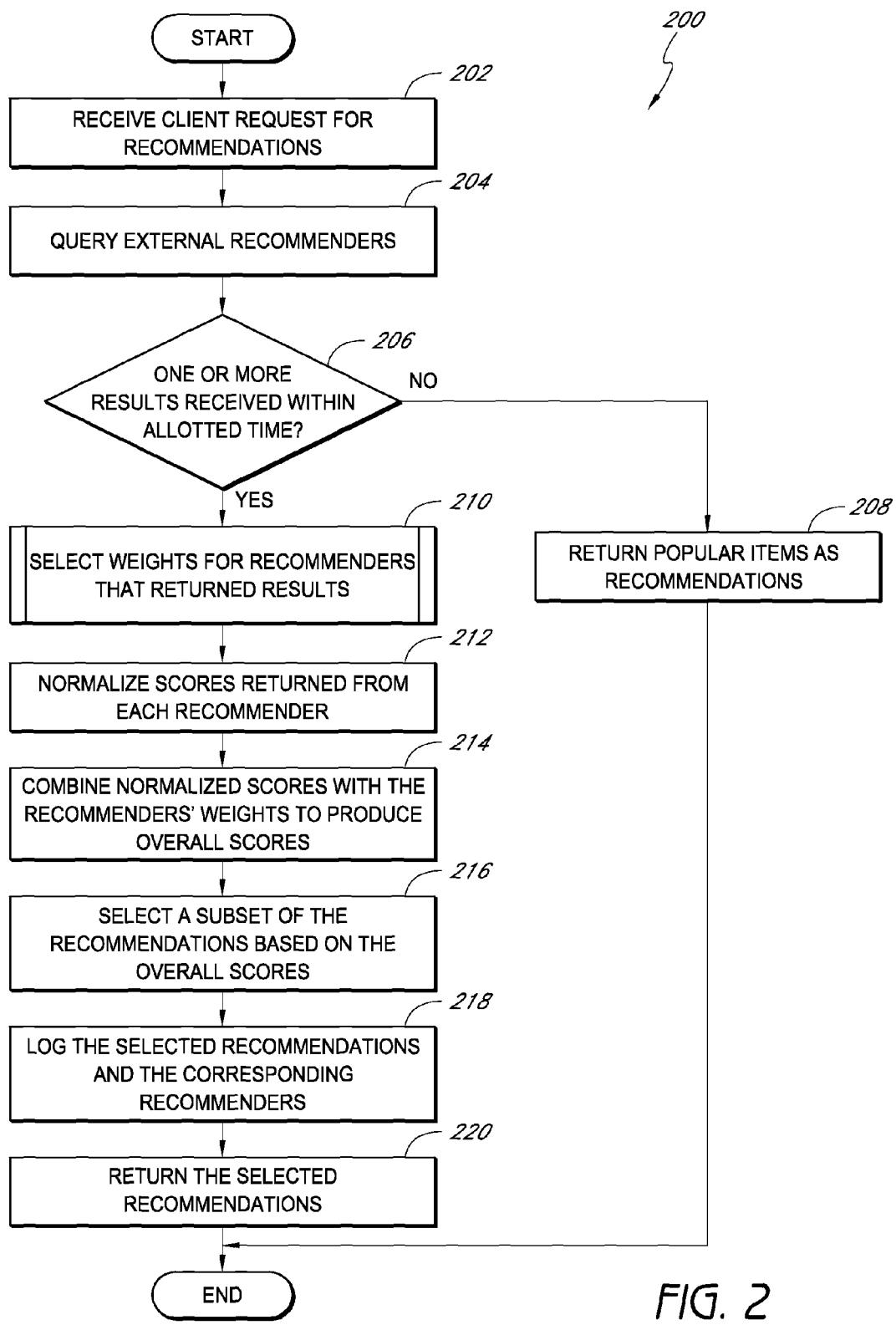
FIG. 2 illustrates an embodiment of a process for responding to recommendation requests.

FIG. 2 illustrates an embodiment of a recommendations process 200 for responding to recommendation requests. The recommendations process 200 can be implemented by the PNS 120 described above. In particular, the recommendations process 200 may be implemented by the recommendations service 160. The recommendations process 200 can retrieve recommendations from a plurality of external recommenders in response to a request from a content site.

At block 202, a request for recommendations is received from a content site. The request for recommendations may be received, for example, via an API call to a PNS. The content site may request the recommendations to be targeted to a particular user and/or item. The content site may further request the recommendations to be optimized for one or more given event types (e.g., purchases, ratings, views, or the like).

At block 204, some or all of the external recommenders can be queried, for example, by the recommendations retriever 164. In response, the recommenders can provide recommendations (e.g., item identifiers) along with raw scores for those items. The recommendations process 200 may normalize these scores, as described below; alternatively, each recommender can provide scores on a normalized scale (e.g., 0 to 1).

At decision block 206, it is determined whether one or more results were received within an allotted time. The allotted time may be a timeout period or the like, which may be defined by a service-level agreement (SLA) with the content site or PNS. According to some embodiments, if the results are not received within the allotted time, other items may be substituted for the results. For example, popular, best-selling, or other pre-selected items may be returned as recommendations at block 208. Thereafter, the recommendations process 200 ends.

If results are received within the allotted time, weights for the recommenders that returned results can be selected at block 210, for example, from a database or lookup table. The weights may be used to selectively emphasize or deemphasize the results from individual recommenders. The weights can be pre-generated by the optimization module 166 based on which recommendations have been most effective for a given user, segment of users, item, event type, combinations of the same, and the like. Thus, a single recommender may have multiple weights. Processes for generating and selecting the weights are described in greater detail below with respect to FIGS. 3 and 4.

Raw scores returned from each recommender may be normalized at block 212. Normalization of the scores can allow the recommendations from different recommenders to be compared. The scores may be normalized in certain embodiments using the techniques described in U.S. patent application Ser. No. 11/771,914, entitled "Recommendation System with Multiple Integrated Recommenders," filed Jun. 29, 2007 (the "'914 application"), referenced above. In particular, paragraphs [0060] through [0091] of the '914 application, which discuss various embodiments of normalization techniques, are specifically incorporated by reference herein. As one example technique, the scores may be normalized as follows:

$$\text{Normalized Score}_i = \frac{(Score_i - Score_{min})}{(Score_{max} - Score_{min})} \quad (1)$$

where Normalized Score$_i$ represents a normalized score for an i$^{th}$ recommendation provided by a given recommender, Score$_i$ represents the raw score for the i$^{th}$ recommendation, Score$_{min}$ represents the minimum observed score from the recommender over a period of time (e.g., a window), and Score$_{max}$ represents the maximum observed score from the recommender over the same period of time.

At block 214, the normalized scores are combined with the recommenders weights to produce overall scores. As a result, the normalized scores may be adjusted by the weights. One way that normalized scores may be combined with a weight for a given recommender is to multiply the normalized scores by the weight, e.g., as follows:

$$\text{Overall Score}_i = (\text{Normalized Score}_i) \cdot (\text{Weight}_{recommender}) \quad (2)$$

where Overall Score$_i$ represents the overall score for an i$^{th}$ recommendation provided by a given recommender and Weight$_{recommender}$ represents a weight assigned to that recommender. Thus, a higher weight may emphasize scores from a recommender, while a lower weight may deemphasize scores. A process for computing recommender weights is described below with respect to FIG. 3. In addition, if multiple recommenders recommend the same item, the overall scores from each of the recommenders can be combined to produce a new overall score for that item.

A subset of the recommendations may be selected based on the overall scores at block 216. For example, a most highly-scored subset of the recommendations may be selected. At block 218, the selected recommendations and the corresponding recommenders may be logged to keep track of which recommenders were responsible for which recommendations. At block 220, the selected recommendations are returned to the content site, and the recommendations process 200 ends.

Figure 3:
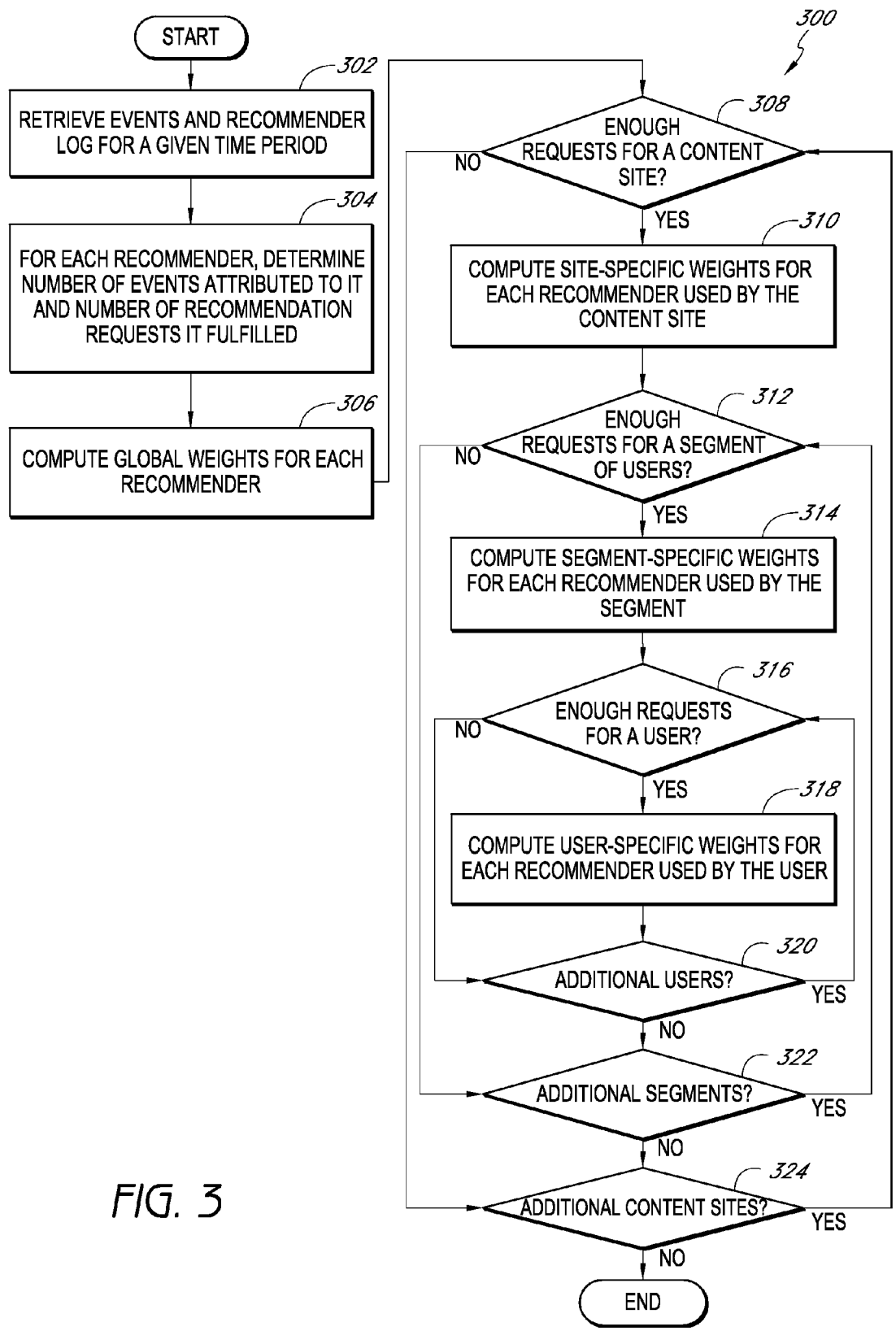
FIG. 3 illustrates an embodiment of a process for computing recommender weights.

FIG. 3 illustrates an embodiment of an optimization process 300 for computing recommender weights. The optimization process 300 can be implemented by the PNS 120 described above. In particular, in certain embodiments the optimization process 300 may be implemented by the optimization module 166 of the recommendations service 160. The optimization process 300 can generate weights that optimize recommendations based on the external recommenders' performance. The optimization process 300 may run initially to assign weights to recommenders. The optimization process 300 may also run periodically to recompute or re-optimize the weights as more events are reported by content sites. For example, the weights may be recomputed daily.

The optimizer 166 can compute weights for a given recommender based on the context-specific performance of the recommender. This context-specific performance can include the recommender's performance with particular users, segments of users, content sites, and the like. The optimization process 300 can generate weights as specific to a user as possible, while maintaining statistical significance. As will be described below with respect to FIG. 4, when selecting weights for a particular content site, the optimizer 166 may select user-specific weights if available, then fall back to segment-specific weights, then site-specific weights (for content sites), and then global weights. If no global-level weights exist, then the recommender may be new or not received traffic yet, so a default weight can be assigned to the recommender.

At block 302, events and a recommender log can be retrieved for a given time period. The events and recommender log may be retrieved from the data repository 150 by the optimization module 166. The events can include user purchases, views of items, ratings of items, and the like, as described above. The events may also include time stamps, indicating when the events were stored in the data repository 150. The recommender log can include information on recommendations provided to content sites and information on which recommenders were responsible for the recommendations (see FIG. 2). In addition, the recommender log may include time stamps of when recommendations were provided.

For each recommender, at block 304 the number of events attributed to the recommender can be determined. In addition, the number of recommendation requests the recommender fulfilled can be determined. In certain embodiments, the events that are attributed to a given recommender include item-related events that were recorded by the PNS within a predetermined time from when the recommender provided the recommendations for the items. For example, if a purchase event was recorded for an item within an hour of a recommender recommending that item (e.g., as determined by the time stamps), the purchase event may be attributed to that recommender. The amount of time used to determine this attribution can vary in different implementations and may be on the order of seconds, minutes, hours, days, a month, or the like. According to some embodiments, a relatively larger time window may be used in conjunction with the application of an exponential decay model to the event and recommender log data, such that more recent activity is considered more relevant. In some implementations, the amount of time for determining attribution can include the period of time between the providing of two sets of recommendations for a given user.

The number of events attributed to a given recommender can be separated by event type. For example, ten item purchases and five item views may be attributed to a single recommender. Alternatively, the events attributed to a recommender can be an aggregate of events regardless of event type.

Where multiple recommenders each recommend an item that is the subject of an event, attribution for the event may be apportioned among the recommenders based on their weights. To illustrate, a first recommender might have a weight of 2 and a second recommender might have a weight of 0.5. To distribute credit for one event, the first and second recommenders may be considered to have contributed to 0.8 and 0.2 events, respectively. In another embodiment, attribution may be apportioned among recommenders based on overall recommendation scores provided by those recommenders. For instance, two recommenders may provide the same recommendation with different overall scores of 0.9 and 0.6, respectively. Based on these scores, attribution for an event might be apportioned 60% to one recommender and 40% to the other.

At block 306, global weights can be computed (or recomputed) for each recommender. As will be described in further detail below with respect to FIG. 4, the global weights for each recommender may be used if more specific weights are not available, such as weights specific to a user, segment, or content site. In one embodiment, the global weights can be computed as follows:

$$\text{Global Weight}_{recommender, type} = \frac{\text{Attributed Events}_{type}}{\text{Requests Served}_{recommender}} \quad (3)$$

where Global Weight$_{recommender, type}$ represents a recommender's global weight for a given event type, Attributed Events$_{type}$ represents events from multiple content sites attributed to the recommender for a given event type during the period of time selected above at block 302, and Requests Served$_{recommender}$ represents the number of requests served by the recommender to content sites over that period of time. The global weights can be stored in a database (e.g., the data repository 150). The database may be a flat-file database.

A single recommender may have a separate global weight for each event type. Having separate global weights for different event types can allow content sites to specify recommender optimizations based on event type. For example, a content site may wish to receive recommendations optimized based on user views rather than user purchases. Alternatively, each recommender may have a single global weight based on all events attributed to the recommender.

At decision block 308, it is determined whether enough requests have been served by a recommender for a given content site. For example, it can be determined whether a statistically significant number of requests were served by the recommender to the content site. The number of requests considered to be statistically significant can be determined heuristically or experimentally. For example, it might be determined that 10,000 requests are statistically significant. If the number of requests is considered enough to be statistically significant, site-specific weights for each recommender used by the content site can be computed at block 310. The site-specific weights may be computed using an equation similar to equation (3) above, with Attributed Events$_{type}$ representing events attributed to the recommender for a given event type and for the specific content site during the selected period of time. The site-specific weights can be stored in a database (e.g., the data repository 150).

If not enough requests were served for the content site to justify generating site-specific weights, it is determined at decision block 324 whether there are additional content sites. If not, the optimization process 300 ends. Otherwise, the optimization process 300 returns to blocks 308 and 310 to compute site-specific weights for another content site.

The optimization process 300 proceeds from block 310 to decision block 312. At decision block 312 it is determined whether enough requests have been served by recommenders for a selected segment of users. As above, the number of request that are considered enough can be a number of statistically significant requests. If enough requests have been served, segment-specific weights for each recommender that generated recommendations for the segment may be computed at block 314. The segment-specific weights may be computed using an equation similar to equation (3) above, with Attributed Events$_{type}$ representing events from the segment attributed to the recommender for a given event type during a selected period of time. The segment-specific weights can be stored in a database (e.g., the data repository 150).

If not enough requests were served for the segment, it is determined at decision block 320 to whether there are additional segments. If not, the optimization process 300 proceeds to decision block 324. Otherwise the optimization process 300 loops back to blocks 312 and 314 to compute segment-specific weights for another segment.

The optimization process 300 proceeds from block 314 to decision block 316. At decision block 316 it is determined whether enough requests have been served for a given user. As above, the number of requests that are considered enough can be a number of statistically significant requests. If so, user-specific weights for each recommender that generated recommendations for the user may be computed at block 318. The user-specific weights may be computed using an equation similar to equation (3) above, with Attributed Events$_{type}$ representing events of the user attributed to the recommender for a given event type during a selected period of time. The user-specific weights can be stored in a database (e.g., the data repository 150).

If not enough requests were served for the user, it can be determined at decision block 320 whether there are additional users. If not, the optimization process 300 proceeds to decision block 322. Otherwise the optimization process 300 loops back to blocks 316 and 318 to compute user-specific weights for another user. Thus, the optimization process 300 may continue until it is determined that no additional users, segments, or content sites are to be processed.

Although not shown, if a recommender has served little or no requests (e.g., the recommender is new or has little traffic), the recommender may be assigned a default weight for each event type. The default weight may be determined experimentally so as to allow recommendations from the recommender to be exposed to content sites. As one example, a default weight could be 0.1 (e.g., on a scale of 0 to 1). Alternatively, certain techniques for giving advertising messages exposure on web pages can be applied to give new recommenders exposure to content sites, examples of which are described in U.S. patent application Ser. No. 11/758,932 entitled "Real-time Adaptive Probabilistic Selection of Messages," filed Jun. 6, 2007, the disclosure of which is hereby incorporated by reference in its entirety.

The optimization techniques described above optimize recommendations based on implicit user feedback, such as purchases, views, and the like. In addition, in some embodiments recommendations can also be optimized based on explicit user feedback about recommendations. Voting-based user feedback, for instance, can be provided by end users to the optimization module 166. The voting-based feedback may be in the form of 1-5 (or any number of) star rankings, helpful/not helpful rankings, a "not interested " indicator, thumbs up/down rankings, or the like, which may be displayed next to each recommendation. The rankings may also be normalized for each user (e.g., by each user's average ranking), so as to more readily compare rankings amongst users. The user rankings provided for a given recommender can be averaged and combined with the weights described above. For instance, an average ranking can be multiplied with the weights assigned to a recommender to produce new weights. In addition, the form of feedback used (implicit, explicit, or a combination of both) can also vary for a given user, segment, or content site. The type(s) of feedback used can be selected empirically based on resulting recommender performance.

Figure 4:
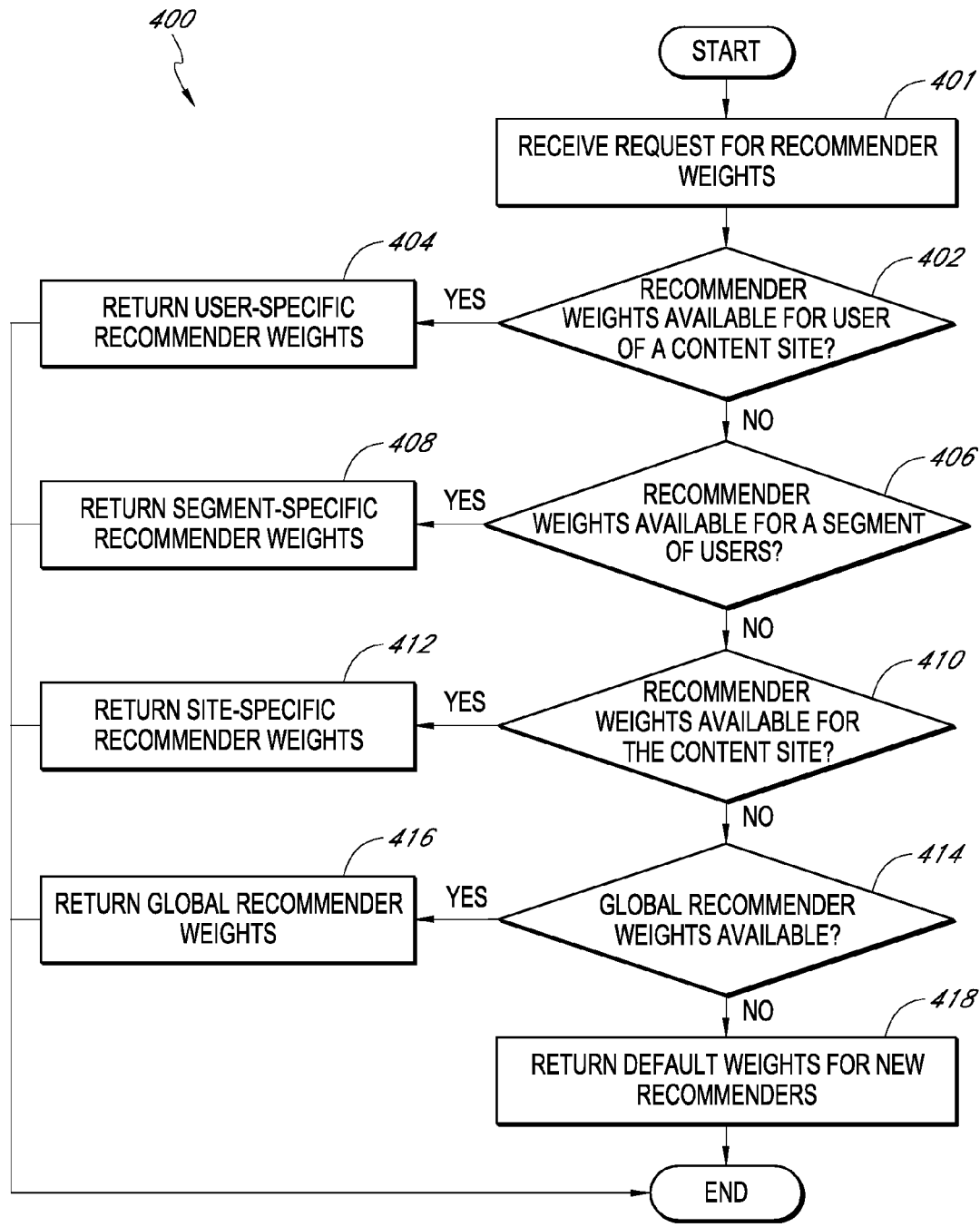
FIG. 4 illustrates an embodiment of a process for selecting recommender weights.

FIG. 4 illustrates an embodiment of a weight selection process 400 for selecting recommender weights. The weight selection process 400 can be implemented by the PNS 120 described above. In particular, in certain embodiments the weight selection process 400 may be implemented by the optimization module 166 of the recommendations service 160. The weight selection process 400 can select the weights generated by the optimization process 300 in response to the recommendations service 160 receiving a request for recommendations. In certain embodiments, the weight selection process 400 illustrates how the optimizer 166 can return the best recommender weights it can provide for the data available.

At block 401, a request for a recommender weights may be received. At decision block 402, it can be determined whether recommender weights are available for a user of a given content site. If so, user-specific recommender weights may be returned at block 404. Thereafter, the weight selection process 400 ends. If at decision block 402, weights are not available for a user, the weight selection process 400 proceeds to decision block 406.

At decision block 406, it is determined whether recommender weights are available for segment of users. If so, segment specific recommender weights are returned at block 408. Thereafter, the weight selection process 400 ends. If at decision block 406, weights are not available for segment of users, the weight selection process 400 proceeds to decision block 410.

At decision block 410, it is determined whether recommender weights are available for the content site. If so, at block 412 site-specific recommender weights are returned. The weight selection process 400 then ends. If at decision block 410, recommender weights are not available for the content site, the weight selection process 400 proceeds to decision block 414.

At decision block 414, it is determined whether global recommender weights are available. If so, global recommender weights are returned at block 416. Thereafter, the weight selection process 400 ends. If, at decision block 414, it is determined that global recommender weights are not available, default weights for new recommenders are returned at block 418. Thereafter, the weight selection process 400 ends.

Figure 5:
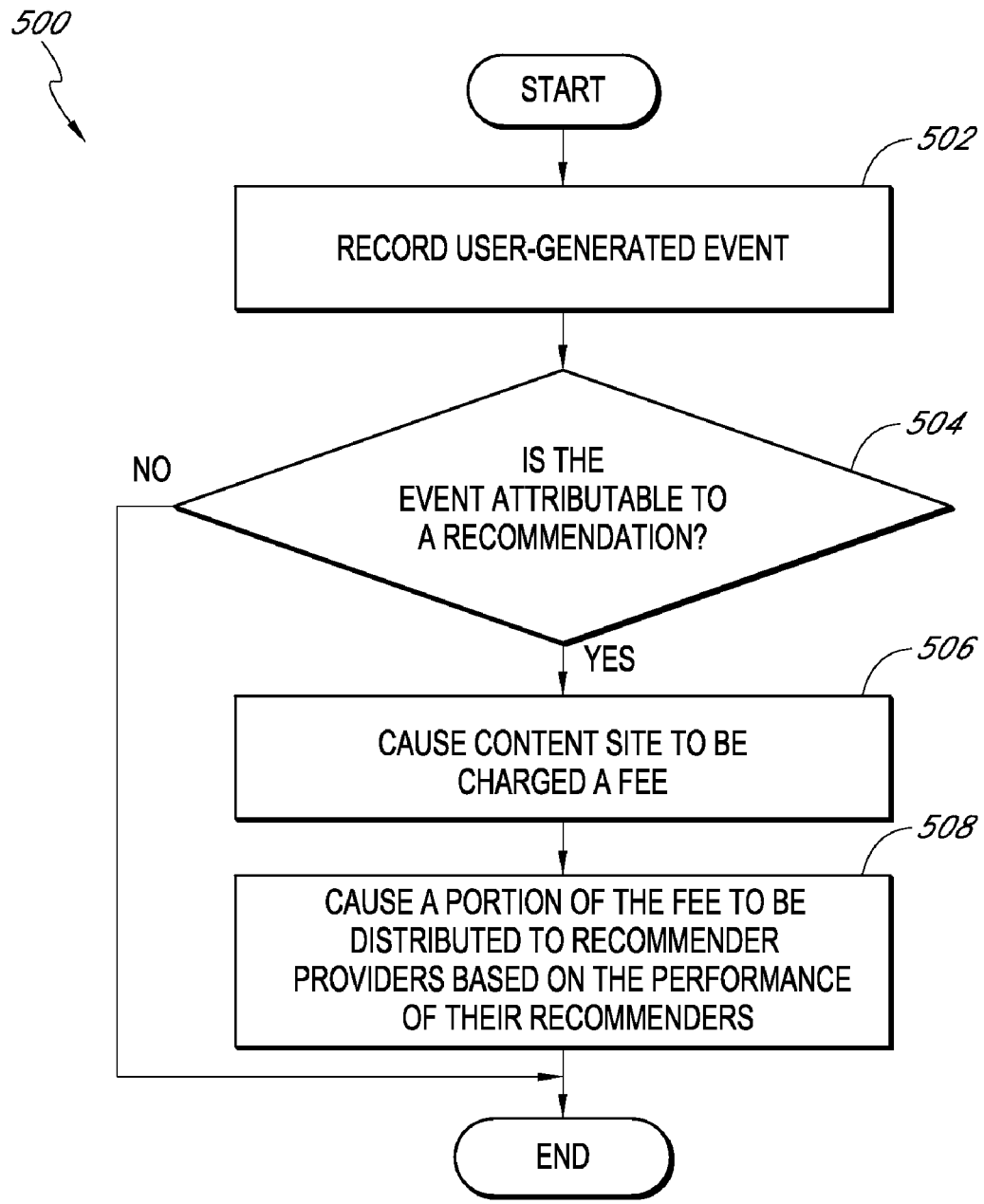
FIG. 5 illustrates an embodiment of a process for compensating recommender providers.

FIG. 5 illustrates an embodiment of a compensation process 500 for compensating recommender providers. The compensation process 500 can be implemented by the PNS 120 described above. In particular, in certain embodiments the compensation process 500 may be implemented by the billing component 132 of the network service interface 130. The compensation process 500 can compensate recommender providers based, or based in part, on the performance of their recommenders.

At block 502, a user-generated event is recorded. The user-generated event may be a purchase or viewing event, as described above. At decision block 504, it is determined whether the event is attributable to a recommendation. The event may be attributable to a recommendation, for instance, if the recommendation and the event occurred within a predetermined timeframe, a number of mouse clicks of a user, or the like. If the event is not attributable to a recommendation, the compensation process 500 ends.

Otherwise, at block 506, the content site may be charged a fee. In the case of a purchase event, the fee may be, for example, a percentage of the purchase price, a fixed fee, and/or a fixed fee that is dependent on the purchase price, among other possibilities. At block 508, a portion of the fee may be distributed to the recommender providers based on the performance of their recommenders. For example, the PNS 120 can credit accounts of the recommender providers. The performance of a recommender may be based on one or more factors, such as a number of events attributed to a recommender, a number of requests served by a recommender, and the like. In one embodiment, the weight of a recommender reflects the performance of the recommender, and the portion of the fee may be distributed according to recommender weights. The weights used to determine the fee distribution may be the weights used when the recommendation was provided to the content site or the most recent weights used to provide recommendations, if different. The portion of the fee may be a portion of the percentage of the purchase price, a fixed fee, or the like.

In various alternative embodiments, the PNS 120 can charge a flat rate per recommendation and distribute a portion of the proceeds to the recommender providers based on the amount of recommendations they provided and their weights. In another model, recommenders may be free by default, but certain recommender providers can charge for their recommendations. The PNS 120 might receive a portion of any fees charged by those recommenders.

In another embodiment, content sites could opt to share their user event data with new recommender providers they have not yet subscribed to. Recommender providers may incent content sites by providing a percentage of the revenue earned by the recommenders that consumed the content site's data. In another model, recommendations are free to content sites, and the recommender providers and the PNS monetize the user data collected by using the user data for targeting advertisements online.

Moreover, in another embodiment, content sites are provided with HTML-based widgets instead of a network services-based list of recommendations. These widgets can contain advertisements, so the content site owner may not be charged for the recommendations. Ad revenue can be shared between the operator of the PNS and the recommender providers based on their global weights.

Figure 6:
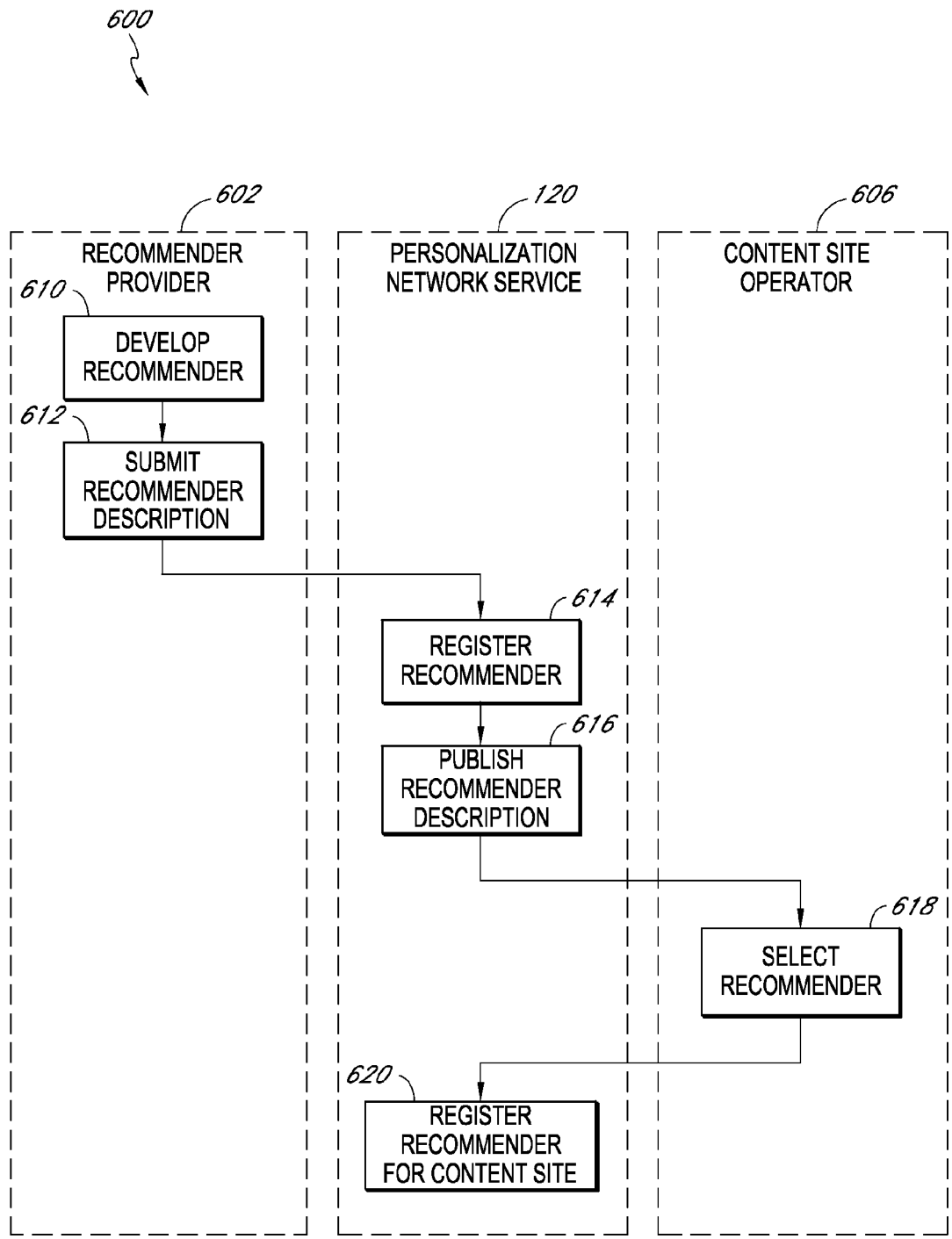
FIG. 6 illustrates an embodiment of a process for registering recommenders with a personalization network service.

FIG. 6 depicts how a registered recommender provider 602 and a registered operator 606 of a content site may interact with the PNS 120. The depicted interactions may, for example, occur via a web site, extranet, and/or web service interface of the PNS. At block 610, the recommender provider 602 may develop a recommender. At block 612, the recommender provider 602 may submit a description of the recommender to the PNS 120 by providing a machine-readable description of the recommender (e.g., a list of input and output parameters) along with a human-readable description of the recommender.

The PNS 120 may register the recommender at 614 using, e.g., the registration module 162. When registering the recommender, the PNS 120 may store information pertaining to the recommender, such as a URI for locating the recommender, in computer storage. In addition, the PNS 120 may publish a human-readable description of the recommender at block 616 for viewing by registered operators of content sites 102. By registering recommenders, the PNS 120 can plug recommenders into a recommendations service dynamically. Similarly, the PNS 120 can remove recommenders dynamically (e.g., by removing their registration).

The published description may be provided in a catalog of recommenders that can be browsed by the content site 606. The content site 606 can access the recommender description and select the recommender at block 618. The content sites 606 selection of the recommender at block 618 can cause the PNS 120 to register the recommender for the content site at block 620. Thus, the content site 606 can choose which recommenders provide recommendations to the content site 606.

Additionally, although not shown, a list of recommenders and/or recommender providers 602 can be made accessible to the recommender providers 602. The list of recommender providers 602 may be ranked based on the success of their recommender algorithms to foster competition among recommender providers 602. Moreover, the PNS 120 can send performance reports to the recommender providers 602. The performance reports can include information on attributed events, weights, and so forth.

The various modules of the systems described herein can be implemented as software applications, hardware and/or software modules, or components on one or more computers, such as servers. While the various modules are illustrated separately, they may share some or all of the same underlying logic or code. In addition, each of the processes, components, and algorithms described above may also be embodied in, and fully automated by, modules executed by one or more computers or computer processors. The modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the modules may be configured to execute on one or more processors, including sub-processors. In addition, the modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, combinations of the same, and the like.

For example, with reference to FIG. 1, components 130, 132, 140, 160, 162, 164, 166, 170 of the PNS 120 may each be implemented in whole or in part in program modules that run on appropriate computer hardware resources, such as a server system that comprises one or more physical servers. The hardware resources used to implement the PNS may be co-located or geographically distributed. The data repository 150 may be implemented as one or more databases, flat file systems, or any other type of computer data repository.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

While certain embodiments of the inventions disclosed herein have been described, these embodiments have been presented by way of example only, and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for providing a network service to one or more content sites, the system comprising:
   a computer system comprising computer hardware programmed to implement at least:
      a network service interface operative to:
         receive a first request from a content site to store event data descriptive of user-generated events, the event data comprising identifiers of particular items and particular users to which the events correspond, the first request being received over a computer network; and
         receive a second request from the content site for item recommendations, the second request being received over the computer network;
      an event data repository operative to store the event data received from the content site, the event data repository comprising physical computer storage;
      a registration module configured to provide functionality for registering an external recommender with a recommendations service;
      a data interface operative to provide access to the event data to a plurality of external recommenders registered with the recommendations service, the plurality of external recommenders being provided by one or more entities that differ from a provider of the recommendations service; and
      the recommendations service comprising a recommendations retriever operative to, in response to the second request:
         query the plurality of external recommenders over the computer network for recommendations responsive to the second request, and
         receive recommendations and associated scores from the external recommenders over the computer network, at least some of the recommendations being generated based at least in part on the event data stored in the event data repository; and
         an optimization module configured to normalize the associated scores;
      wherein the recommendations service is further configured to select a subset of the recommendations, based at least in part on the normalized scores, to provide to the content site.

2. The system of claim 1, wherein the optimization module is further configured to optimize the recommendations based at least in part on user-generated events responsive to previous recommendations results and a number of previous content site requests served by the external recommenders.

3. The system of claim 2, wherein the optimization module is further operative to assign weights to the external recommenders.

4. A computer-implemented method of optimizing recommender results, the method comprising:
   by a computer system comprising computer hardware:
      receiving a request from a content site for item recommendations, the request being received with a personalization network service;
      in response to the request from the content site, requesting recommendations from a plurality of recommenders, wherein the plurality of recommenders comprise external recommenders that are operated by different operators than an operator of the personalization network service;
      receiving recommendations and corresponding scores from the recommenders;
      applying weights to each of the recommenders;
      combining the scores with the weights to produce overall scores;
      selecting a subset of the recommendations based on the overall scores to provide to the content site; and
      adjusting the weights for each of the recommenders based at least in part on user-generated events responsive to the recommendations.

5. The method of claim 4, wherein applying the weights to each of the recommenders comprises applying the weights based at least in part on user-generated events responsive to previous recommendations results.

6. The method of claim 5, wherein the user-generated events comprise one or more of purchase events, item viewing events, and item rating events.

7. The method of claim 4, wherein applying the weights to each of the recommenders comprises applying site-specific weights to at least some of the recommenders.

8. The method of claim 4, wherein applying the weights to each of the recommenders comprises applying user-specific weights to at least some of the recommenders.

9. The method of claim 4, wherein applying the weights to each of the recommenders comprises applying user segment-specific weights to at least some of the recommenders.

10. The method of claim 4, wherein applying the weights to each of the recommenders comprises applying a default weight to one or more of the recommenders.

11. The method of claim 4, further comprising normalizing the scores provided by each of the recommenders to produce normalized scores.

12. The method of claim 11, wherein combining the scores with the weights to produce overall scores comprises combining the normalized scores with the weights to produce the overall scores.

13. The method of claim 4, wherein at least some of the recommenders are operated by recommender providers separate from an operator of the personalization network service.

14. A computer-implemented method of optimizing recommender results, the method comprising:

by a computer system comprising computer hardware:
  receiving a request from a content site for item recommendations over a network;
  requesting recommendations from a plurality of recommenders in response to the request from the content site, wherein the plurality of recommenders comprise external recommenders that are operated by different operators than an operator of the personalization network service;
  receiving recommendations results from the recommenders;
  adjusting the recommendations results based at least in part on one or more of user-generated events responsive to previous recommendations results and a number of previous content site requests served by the recommenders; and
  selecting a subset of the adjusted recommendations results to provide to the content site.

15. The method of claim 14, wherein the user-generated events comprise one or more of purchase events, item viewing events, and item rating events.

16. The method of claim 14, wherein adjusting the recommendations results comprises applying weights to the recommendations results.

17. A computer-implemented method of providing a network service to content sites, the method comprising:
  by a computer system comprising computer hardware:
  receiving registration submissions for recommenders from a plurality of recommender providers, the registration submissions operative to request registration of the recommenders with a recommendations system, wherein the recommender providers are different entities than a provider of the recommendations system;
  storing, in computer storage, access information for accessing the recommenders with the recommendations system;
  receiving requests from one or more content sites for item recommendations, the requests being received over a computer network with a network service interface;
  in response to the requests, using the recommendations system to cause the recommenders to provide recommendations for the one or more content sites;
  normalizing scores provided by the recommenders to produce normalized scores;
  applying weights to each of the recommenders; and
  combining the normalized scores with the weights to generate overall scores to be used in selecting recommendations to provide to the one or more content sites.

18. The method of claim 17, wherein the information for accessing the recommenders with the recommendations system comprises uniform resource indicators.

19. The method of claim 17, further comprising receiving recommender selections from the one or more content sites.

20. The method of claim 17, wherein applying weights to each of the recommenders further comprises weighting the recommenders based on the performance of the recommenders.

21. The method of claim 20, further comprising receiving weighting selections from the one or more content sites.

22. A system for enabling site operators to obtain item recommendations for presentation to users, the system comprising:
  a computer data repository that stores information regarding a plurality of recommenders, including network addresses for accessing the recommenders on a network, each recommender provided by a respective recommender provider, at least some of the recommenders provided by different recommendation providers than others, the recommenders capable of using collected event data regarding user-generated events to select particular items to recommend to users; and
  a server system comprising computer hardware operative to provide a service through which content sites obtain recommendations from the plurality of recommenders for presentation to users, the server system responsive to a request from a content site for recommendations by using the network addresses to request recommendations from the recommenders, and by combining resulting recommendation sets returned by the recommenders to generate a combined set of recommendations to provide to the content site;
  wherein said combining comprises:
    normalizing scores provided by the recommenders to produce normalized scores,
    applying weights to each of the recommenders, and
    combining the normalized scores with the weights to generate overall scores to be used in selecting the combined set of recommendations.

23. The system of claim 22, wherein the server system is operative to monitor context-specific performance of each recommender in each of a plurality of contexts, and to use collected data regarding the context-specific performance to determine, for each of the contexts, how much weight to give to particular recommenders in combining the recommendation sets returned by the recommenders.

24. The system of claim 23, wherein the context-specific performance of each recommender comprises one or more of user-specific performance, segment-specific performance, and site-specific performance.

25. The system of claim 22, wherein the server system provides an interface that enables an operator of a content site to specify which of the plurality of recommenders are to be used to generate recommendations for the content site.

26. The system of claim 1, wherein the computer system comprises multiple physical computing devices.

27. The system of claim 1, wherein the registration module is further configured to allow a provider of an external recommender associated with the plurality of external recommenders to provide machine readable descriptions of the external recommender.

28. The system of claim 3, wherein the content site selects at least some of the weights to assign to the external recommenders.

* * * * *